United States Patent [19]
Gerbrandt

[11] 3,786,593
[45] Jan. 22, 1974

[54] FOLDABLE TRAP

[76] Inventor: George Gerbrandt, 2273 Lawson Ave., West Vancouver, British Columbia, Canada

[22] Filed: July 31, 1972

[21] Appl. No.: 276,854

[52] U.S. Cl. .................................................. 43/100
[51] Int. Cl. ............................................ A01k 69/00
[58] Field of Search ........................ 43/100, 105, 65

[56] References Cited
UNITED STATES PATENTS

| | | | |
|---|---|---|---|
| 1,188,185 | 6/1916 | Krulish | 43/105 |
| 3,699,702 | 10/1972 | Lankenau | 43/100 |
| 1,648,025 | 11/1927 | Molloy | 43/105 |

Primary Examiner—Louis G. Mancene
Assistant Examiner—Gregory E. McNeill
Attorney, Agent, or Firm—Kellard A. Carter

[57] ABSTRACT

A trap having a frame enclosed by a box-like net. The frame has a centre post and normally radially extending arms which are hinged to swing parallel to one another thereby folding the trap. A latching device is provided to hold the frame open or unfolded and resilient members apply tension to end walls of the trap which serve to keep the end walls taut and properly shaped to provide lead-ins to entrance openings formed therein.

7 Claims, 8 Drawing Figures

PATENTED JAN 22 1974 3,786,593

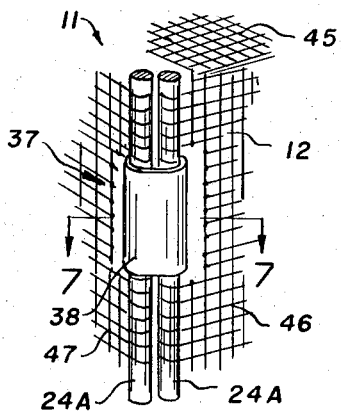
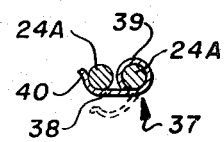
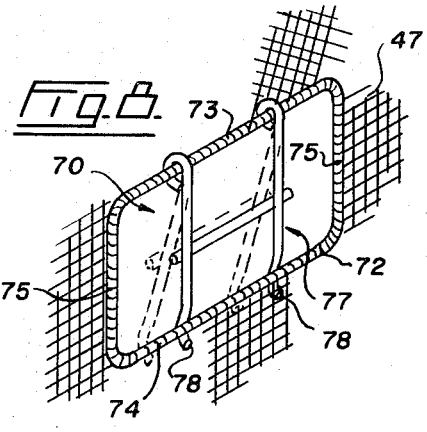

FOLDABLE TRAP

My invention relates to a trap which is suitable for use in catching crustaceans such as crabs, lobsters and prawns or shrimps.

One well recognized disadvantage of a crab or other trap is the amount of space they occupy when being stored or transported from place to place. This is particularly noticeable aboard a fishboat where the holds are designed primarily to store fish and deck space is at a premium. Numerous attempts have been made to make such traps so that they can be collapsed in some way for storage but known traps of this nature are objected to by many fishermen for a variety of reasons. Some collapsible traps are complicated and cannot readily be extended to a position of use under the adverse conditions in which fishermen are often required to work. Other such traps tend to collapse or at least partially collapse on the ocean floor and therefore they cannot fish effectively. Still others are heavy and cumbersome which makes the task of hauling them to the surface more arduous than usual.

I overcome these as well as other disadvantages of related devices by providing a trap which is foldable somewhat like a book. The lightweight and sturdily constructed trap is very readily opened and closed and, in the latter position, the trap forms a neat, compact bundle which can be stacked with other such traps to occupy a minimum of space on the deck of a fishboat.

Figure 1:
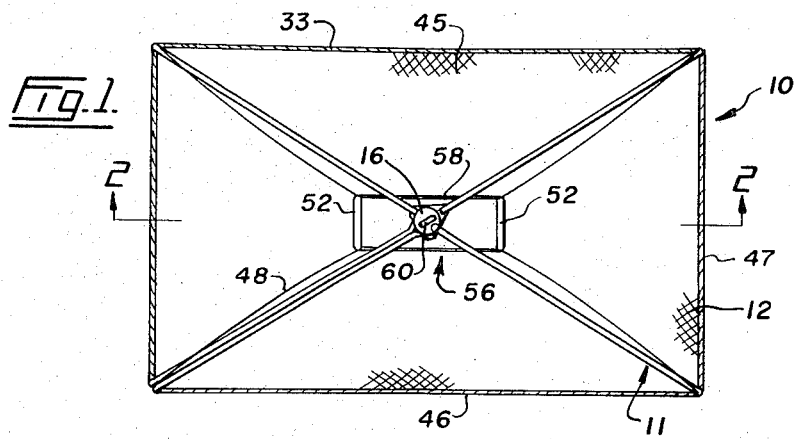
Figure 2:
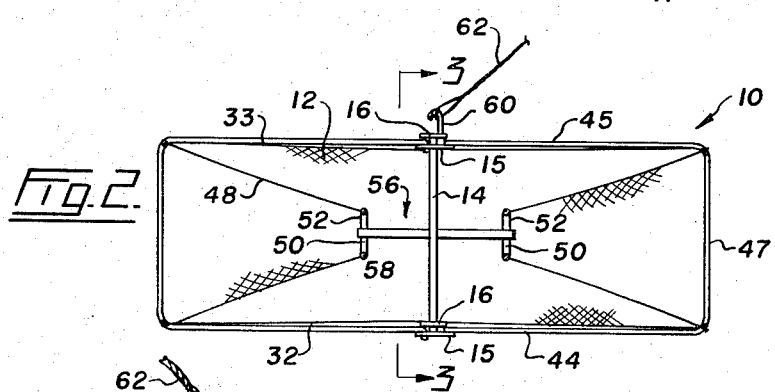
Figure 3:
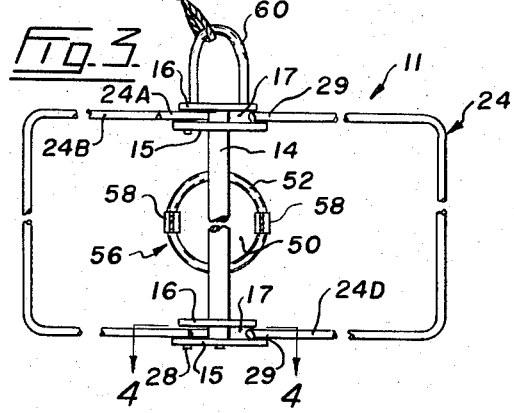
Figure 5:
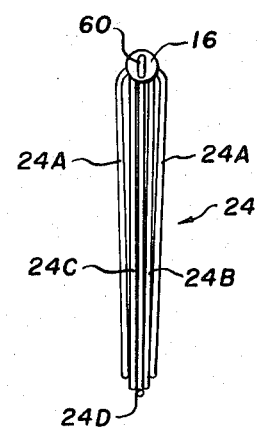
Figure 4:
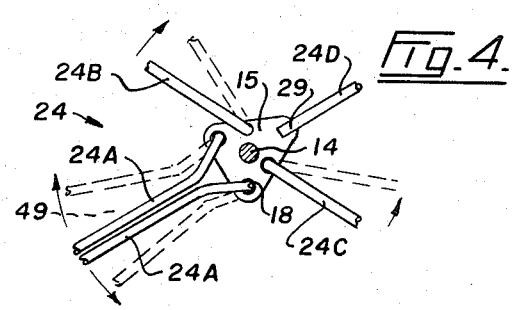

In drawings which illustrate preferred embodiments of the invention,

FIG. 1 is a plan view of a foldable trap, in accordance with the present invention, FIG. 2 is a vertical section taken on the line 2—2 of FIG. 1, FIG. 3 is a fragmentary detail view showing the connection between a post and arms of the trap frame, with an enclosing net purposely omitted, FIG. 4 is a section taken on the line 4—4 of FIG. 3, FIG. 5 is a plan showing the trap frame only in closed position, FIG. 6 is a detailed perspective view showing latching means for the trap, FIG. 7 is a section taken on the line 7—7 of FIG. 6, and FIG. 8 is a perspective view showing a modified entrance arrangement for the trap.

Referring to the drawings, the numeral 10 indicates a foldable trap having a hinged frame 11 enclosed by a net 12.

The frame designated generally by the numeral 11 is shown to comprise a tubular centre post 14 the opposite ends of which are each fitted with lower and upper flanges 15 and 16. These horizontal flanges 15 and 16 are vertically spaced apart to provide grooves 17 which encircle the post 14. The flanges 15 have circumferentially spaced openings 18, see FIG. 4, there being four such openings all told in this particular embodiment of the invention.

Frame 11 includes five arms 24 which preferably are formed of metal rods shaped to provide a substantially rectangular and C-shaped configuration as shown best in FIGS. 2 and 3. The frame arms include a pair designated as 24A, two others designated 24B and 24C, with the fifth arm being designated 24D. Arms 24A, B and C each have inner ends which project into the grooves 17 and which are downwardly turned as at 28 so as to project freely through the openings 18. Thus, the arms 24A, B and C are mounted to swing in a common horizontal plane about the post 14. Arm 24D has inner ends 29 which are welded to the flange 15 so that this arm is fixed and cannot swing as do the other arms. It will be noted the arm 24C could be made the fixed arm just as easily as the arm 24D or, alternatively, all five arms of the frame 11 could be mounted for swinging movement on the post 14.

The above described hinged frame 11 is contained by the net 12 and, when the present trap is unfolded to the position of use shown in FIG. 1, the diagonally extending arms 24 support the net so that it assumes an oblong shape. In order to reinforce the net 12 in this position, I tie the arms 24 together by means of two lengths of cord 32 and 33. One end of the bottom cord 32 is tied to the outer end of one of the arms 24A and from there the cord passes over and is suitably secured to the outer ends of the arms 24B, D and C in that order before being tied to the same end of the other arm 24A. The top cord 33 is fastened in a similar manner to the several arms of the hinged frame 11. This arrangement of the cords 32 and 33 keeps the net 12 properly supported between the arms 24 and allows arms A, B and C to be swung clockwise (i.e., FIG. 4) into positions alongside the arm 24D.

Trap 10 is provided with latching means generally indicated at 37 for releasably securing together the two arms 24A to retain the hinged frame 11 in the open position shown in FIG. 1 and 4. As shown best in FIGS. 6 and 7, the means 37 comprises a clasp 38 formed of a rectangular strip of spring metal having one side edge 39 wrapped around the vertically disposed outer end of one of the arms 24A whereby said clasp is hingedly mounted on that arm. The opposite or free edge 40 of the metal strip forming the spring clasp 38 is hook-shaped as shown best in FIG. 7. Thus, when the arms 24A are side by side, the spring clasp 38 can be swung on said one arm and snapped over the adjacent arm to lock together these two arms of the hinged frame 11.

In the open or unfolded position of the trap 10, the net generally indicated at 12 has a bottom wall 44, a top wall 45, side walls 46, and end walls 47. Walls 44 and 45 are approximately parallel when the frame 11 is opened (FIGS. 1 and 2) and so are the side walls 46. The end walls 47 are supported, as will be described later, so as to form inwardly projecting funnels 48 which can be seen in FIGS. 1 and 2 as well. The net 12 is secured by cord ties or the like (not shown) to the arms 24A and may be suitably secured in a similar manner to the other arms of the frame 11 as well. Thus, when the arms 24A are separated slightly as shown by dotted lines in FIG. 4, a discharge opening 49 is formed in the netting which encloses and contains the hinged frame 11.

The foldable trap is provided with entrance openings 50, there preferably being one such opening formed in the center of each end wall 47 of the net. Each opening 50 is bounded by a circular frame 52 in the form of a metal ring and the ends of the twine used on the end walls 47 of the net are suitably secured to this ring-like frame. Entrance openings 50 of this particular size and placement on the trap 10 are intended to admit small crustaceans such as prawns or shrimps.

The present invention includes resilient means generally indicated at 56 for applying tension to the end walls 47 of the net when the frame 11 is in the open position whereby to maintain the funnel-like shape previously mentioned. FIGS. 1, 2 and 4 show the means 56 as comprising elastic bands 58 which interconnect the ring frames 52 defining the entrance openings 50. These bands 58 are of a selected length so as to apply suitable tension to the end walls 47 of the net which causes these normally inwardly projecting walls to become funnel-shaped with the entrance openings 50, of course, being located in the neck of the funnel.

Mounted on the top flange 16 is an eye 60 to which an end of a rope 62 (FIG. 2 only) is secured. The trap 10 is adapted to be raised and lowered in the water by means of the anchor rope 62 and the rope is secured to a surface float (not shown) which enables the trap to rest on the ocean floor during the fishing operation.

In operation, the trap 10 is suitably baited and is thrown overboard to settle to the bottom where it lands in an upright position due to the restraining action of the rope 62 and the attached surface float. Shrimp and prawns which may sense the bait, will approach the trap and be directed by the funnel-shaped walls 47 to the openings 50 providing admittance to the interior of the trap. Most of these creatures will be trapped since they do not find their way out as easily because of the particular shape of the walls 38 of the net which make it more difficult to escape than to enter the trap.

When the trap 10 is raised to the deck of the fishboat, it is a simple matter to empty the device and if necesary to rebait it. This is done by releasing the spring clasp 38 and spreading the arms 24A slightly to form the discharge opening 49 (FIG. 4). The trap is then shaken to dump the prawns through the opening 49 into a container whereupon the entire fishing operation can be repeated.

The trap 10 can be folded for storage on the deck of a fishboat or elsewhere simply by releasing the clasp 38. This allows the arms 24A, B and C to be folded to a position approximately parallel with the arm 24D as shown in FIG. 5. In this folded position, the trap 10 forms a neat, compact bundle which conveniently can be stacked with other similarly folded traps to occupy a minimum amount of deck space.

Referring now to FIG. 8, the numeral 70 indicates generally a modified entrance opening for larger crustaceans such as crabs and lobsters. The large entrance opening 70 is formed desirably one in each of the walls 47 of the net and has a rectangular frame 72. Each frame 72 has a top bar 73, a bottom bar 74, and side bar 75 all of which are tied into the netting. Swingably mounted on the top bar 73, is a gate 77 having free ends 78 which project below the bottom bar 74. Thus, the gate 77 can be pushed inwardly by a lobster or crab entering the trap but cannot be swung outwardly to open because of engagement of the free ends 78 with the bottom bar 74.

From the foregoing, it will be apparent I have provided a simple and economically constructed trap which can be folded and unfolded with ease and speed. The size of the folded trap is a great deal less than the size of the trap in open position and the folded trap is flat and substantially oblong which lends itself to stacking with other similarly folded traps.

I claim:

1. A foldable trap comprising a hinged frame having a centre post and a plurality of arms mounted thereon, some of the arms being swingable about the post between a radially extending open position and a closed position in which the arms are disposed substantially parallel to one another, a net supported by the open frame to provide enclosing walls, at least one of the enclosing walls having an entrance opening, said open frame having two of said arms extending radially outward from the post substantially parallel and in contact with one another, and latching means for releasably securing together the said two arms whereby to retain the frame in the open position.

2. A trap as claimed in claim 1, in which said enclosing walls includes funnel-shaped end walls and resilient means applying tension to the end walls of the net when the frame is in the open position.

3. A trap as claimed in claim 1, in which said entrance opening is enclosed by a frame having a top bar and a bottom bar, a gate hingedly secured to the top bar and normally being prevented by engagement with the bottom bar from swinging outwardly beyond the adjoining side wall of the net.

4. A trap as claimed in claim 1, in which said latching means comprises a spring clasp hingedly mounted on one of said two arms and having a hooked free end adapted to be snapped into gripping engagement with the other of said two arms.

5. A trap as claimed in claim 2, in which resilient means comprises a plurality of elastic members extending between the end walls of the net.

6. A foldable trap comprising a hinged frame having a centre post and a plurality of arms hingedly mounted thereon, some of said arms being swingable about the post between a radially extending open position and a closed position in which the arms are disposed substantially parallel to one another; a net supported by the open frame to provide a bottom wall, a top wall, side walls and end walls; said end walls each having a centrally disposed entrance opening bordered by a frame, said open frame having two of said arms extending radially outwards from the post substantially parallel and in contact with one another, latching means releasably secured together the said two arms whereby to retain the frame in the open position, and resilient means interconnecting the entrance frames and applying tension to the end walls of the net when the frame is in the open position.

7. A trap as claimed in claim 6, in which said end walls are funnel-shaped to project inwardly and support the entrance frames near the centre post.

\* \* \* \* \*